(12) United States Patent
Kadowaki

(10) Patent No.: US 6,282,310 B1
(45) Date of Patent: *Aug. 28, 2001

(54) IMAGE PROCESSING APPARATUS, METHOD, AND IMAGE PROCESSING SYSTEM

(75) Inventor: Toshihiro Kadowaki, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/492,442

(22) Filed: Jun. 19, 1995

(30) Foreign Application Priority Data

Jun. 20, 1994 (JP) .................................................. 6-136954

(51) Int. Cl.[7] ........................................................ G06K 9/00
(52) U.S. Cl. ...................................... 382/162; 380/210
(58) Field of Search .................................. 382/162, 166, 382/167, 232, 100, 254, 274; 358/523, 297, 515, 518, 519, 520; 380/10, 20, 210, 213

(56) References Cited

U.S. PATENT DOCUMENTS

| 5,014,310 | * | 5/1991 | Walker et al. ........................ 380/10 |
| 5,202,935 | * | 4/1993 | Kanamori et al. .................... 382/162 |
| 5,204,718 | * | 4/1993 | Morita .................................. 352/246 |
| 5,212,723 | * | 5/1993 | Griesshaber ........................... 380/11 |
| 5,347,374 | * | 9/1994 | Fuss et al. ............................. 358/522 |
| 5,376,963 | * | 12/1994 | Zortea ................................... 348/222 |
| 5,442,700 | * | 8/1995 | Snell et al. ............................. 380/11 |
| 5,485,284 | * | 1/1996 | Shono et al. .......................... 358/504 |
| 5,552,894 | * | 9/1996 | Aiba ..................................... 382/162 |
| 5,552,905 | * | 9/1996 | Tanaka ................................. 382/167 |
| 5,659,628 | * | 8/1997 | Tachikawa et al. .................. 382/135 |

* cited by examiner

Primary Examiner—Jay Patel
(74) Attorney, Agent, or Firm—Fitzpatrick, Cella, Harper & Scinto

(57) ABSTRACT

An image processing circuit of an image processor performs predetermined image processes on input image data from an external device. A data scrambling circuit scrambles the processed image data in accordance with input scrambling information from a controller of an image forming system. A data scrambling circuit of the image forming system receives the scrambled input data from the image processing apparatus. A printer forms an image on the basis of the received image data. Accordingly, without changing ROMs of the image processor, a scrambling function is arbitrarily changed by the image forming system.

24 Claims, 8 Drawing Sheets

IMAGE PROCESSING APPARATUS, METHOD, AND IMAGE PROCESSING SYSTEM

BACKGROUND OF THE INVENTION

The present invention relates to an image processing apparatus and method, and an image processing system and, more particularly, to an image processing apparatus and method, and an image processing system which performs image processing for forming an image and various image processing on an image inputted from an image input apparatus.

A conventional printer system which forms an image based on image data received from a host computer consists of, as shown in FIG. 1, an image processing apparatus 1 and an image forming apparatus 2.

As shown in FIG. 1, image data sent from an external device 3, such as a host computer, and received by a communication circuit 4 is stored in an image memory 5, which has enough capacity to store one page of image data under control of a CPU 8. Note that a ROM 9 is used for storing programs for the CPU 8, and a RAM 10 serves as a work memory for the CPU 8. Reference numeral 11 denotes a CPU bus connecting the devices described above.

The image forming apparatus 2, for example is an electrophotographic type color printer and has a printer engine 19 which forms an image on the basis of image signals that are read from the image memory 5 and that are processed by various kinds of image processing by an image processing circuit 6. The CPU 8 of the image processing apparatus 1 communicates with a controller 15 of the image forming apparatus 2 via a device side communication circuit 17.

The image memory 5 stores RGB (red, green, and blue) image data, and the image processing circuit 6 converts the RGB data into CMYK (cyan, magenta, yellow, and black) data and sends it to the image forming apparatus 2. The CMYK data depends on toner colors and characteristics of the image forming apparatus 2 to form an image. A conversion function for converting from a RGB color space to a CMYK color space is fixed for each image forming apparatus and is stored in the ROM 9.

A printer system as described above can be constructed by connecting the separately manufactured image processing apparatus 1 and image forming apparatus 2 with an interface cable.

Accordingly, there may be a case where a manufacturer, referred as "a first manufacturer", develops an image forming apparatus 2 and another independent manufacturer, referred as "a second manufacturer", uniquely develops an image processing apparatus 1, then these two apparatuses are connected to form the printer system. In such a printer system, problems arise as described below.

(1) The image processing apparatus 1 manufactured by the second manufacturer may not properly control the image forming apparatus 2 manufactured by the first manufacturer. Under this situation, the image forming apparatus 2 may be damaged. Therefore, there is a possibility that the image forming apparatus 2 will fail earlier than an expected life time of the apparatus when used in a matched configuration.

For example, in the image forming apparatus, the total amount of CMYK color toner to be overlaid is limited to a prescribed amount. An image processing is usually performed so that the total amount of the toner to be transferred onto a recording medium is under the prescribed amount. However, there is a danger that the image processing apparatus manufactured by the second manufacturer may output image data instructing the image forming apparatus to use toners in excess of the prescribed amount. In this case, toner which is not fixed on the recording medium may scatter over the inside of the image forming apparatus, and the fixing unit may be damaged. As a result, the image forming apparatus will not last as long as it is originally designed for.

(2) Especially, when a single color image data is processed with different kinds of image processing relating to colors in different routines which produce a plurality of sets of image data to be outputted, colors of each formed image will differ from those of others. This problem occurs not only in the image forming apparatus but also in the image input apparatus.

Therefore, The image processing apparatus 1 to be connected to the image forming apparatus 2 is desirably manufactured by the same manufacturer as the image forming apparatus 2, or recognizes characteristics of the image forming apparatus 2 if manufacturers of the image processing apparatus 1 and the image forming apparatus 2 differ from each other. Accordingly, a function is necessary which does not allow an undesirable image processing apparatus 1 to be connected to the image forming apparatus 2. As a method for realizing such a function, there is a data scrambling method as described below.

First, the image data is processed in the image processing circuit 6, then applied with a data conversion function f in a data scrambling circuit using a ROM, and is sent to the image forming apparatus 2. The image forming apparatus 2 applies an inverse data conversion function $f^{-1}$ to the received image data, and then reproduces the image data. Thus, the data conversion function f is a reversible function, and the image data before conversion and after conversion is the same. The data conversion function f is written in the ROM in the data scrambling circuit of the image processing apparatus 1, and the inverse data conversion function $f^{-1}$ is written in the ROM in the data scrambling circuit of the image forming apparatus 2, both as LUTs (look up tables).

By applying the above-described method, the image forming apparatus 2 does not print an image correctly unless scrambled image data is inputted. In other words, the image processing apparatus 1 having a function capable of performing a scrambling process on image data must be connected to the image forming apparatus 2.

However, in the aforesaid apparatuses and system, there are the following problems.

First, since the scrambling function is memorized in the ROM, the function cannot be changed without exchanging the ROMs. Further, when the function is to be changed in an authorized image processing apparatus, it is quite troublesome to exchange the ROMs.

Second, if the conversion function is revealed by way of reverse engineering or the ROM is copied entirely, any image processing apparatus which is not authorized can be connected to the image forming apparatus.

Further, the scrambling function and the method for using same has to be open to an authorized manufacturer, which may cause the secret to be easily, discovered thus causing more problems to the manufacturer.

Similarly for the above-described problem, there is a problem in that image processing parameters used in functions, such as a RGB-CMYK conversion function, in the image processing circuit are fixed for each image forming apparatus and each image input apparatus, and cannot be easily changed. This especially causes a problem when a newly developed image forming apparatus and/or image input apparatus is connected to an authorized image processing apparatus. More specifically, in order to make the image processing apparatus perform image processing suitable for the image forming apparatus and/or the image input apparatus, it is necessary to change ROMs of the image processing apparatus, which is troublesome.

SUMMARY OF THE INVENTION

The present invention has been made in consideration of the above situation, and has its object to provide an image processing apparatus in which a scrambling function can be arbitrarily changed without exchanging ROMs.

Accordingly, a preferred embodiment of the present invention discloses an image processing apparatus including: input means for inputting image data; processing means for performing predetermined image processes on the image data inputted by the input means; and conversion means for converting the image data processed by the processing means on the basis of conversion information inputted from an external device and for outputting the converted image data to the external device.

Further, the invention is also directed to an image processing apparatus including: conversion means for converting data inputted from an external device on the basis of conversion information inputted from the external device and obtaining image data; processing means for applying predetermined image processes to the image data obtained by the conversion means; and output means for outputting the image data processed by the processing means.

Another object of the present invention is to provide an image processing apparatus in which image processing parameters can be arbitrarily changed without changing ROMs.

Accordingly, a preferred embodiment of the present invention is directed to an image processing apparatus including:
input means for inputting image data; and processing means for processing the image data inputted by the input means on the basis of processing information inputted from an external device and outputting the processed image data to the external device, wherein the processing information relates to image processes, and wherein the processing means performs image processes on the image data based on the processing information.

Further, the invention is also directed to an image processing apparatus including: input means for inputting image data from an external device; processing means for processing the image data inputted by the input means on the basis of processing information inputted from the external device; and output means for outputting the image data processed by the processing means, wherein the processing information relates to image processes, and wherein the processing means performs image processes on the image data on the basis of the processing information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the present invention is described in detail below in accordance with the accompanying drawings.

First Embodiment

A first embodiment of the present invention relates to an image output system comprising an image processing apparatus and an image forming apparatus, such as a printer. In this system, a data scrambling circuit in the image processing apparatus can be directly programmed from the image forming apparatus. It should be noted that an image forming apparatus is not limited to a printer, and can be a display, a copy machine, a film recorder, and so on. Following is an explanation of the system.

Figure 1:
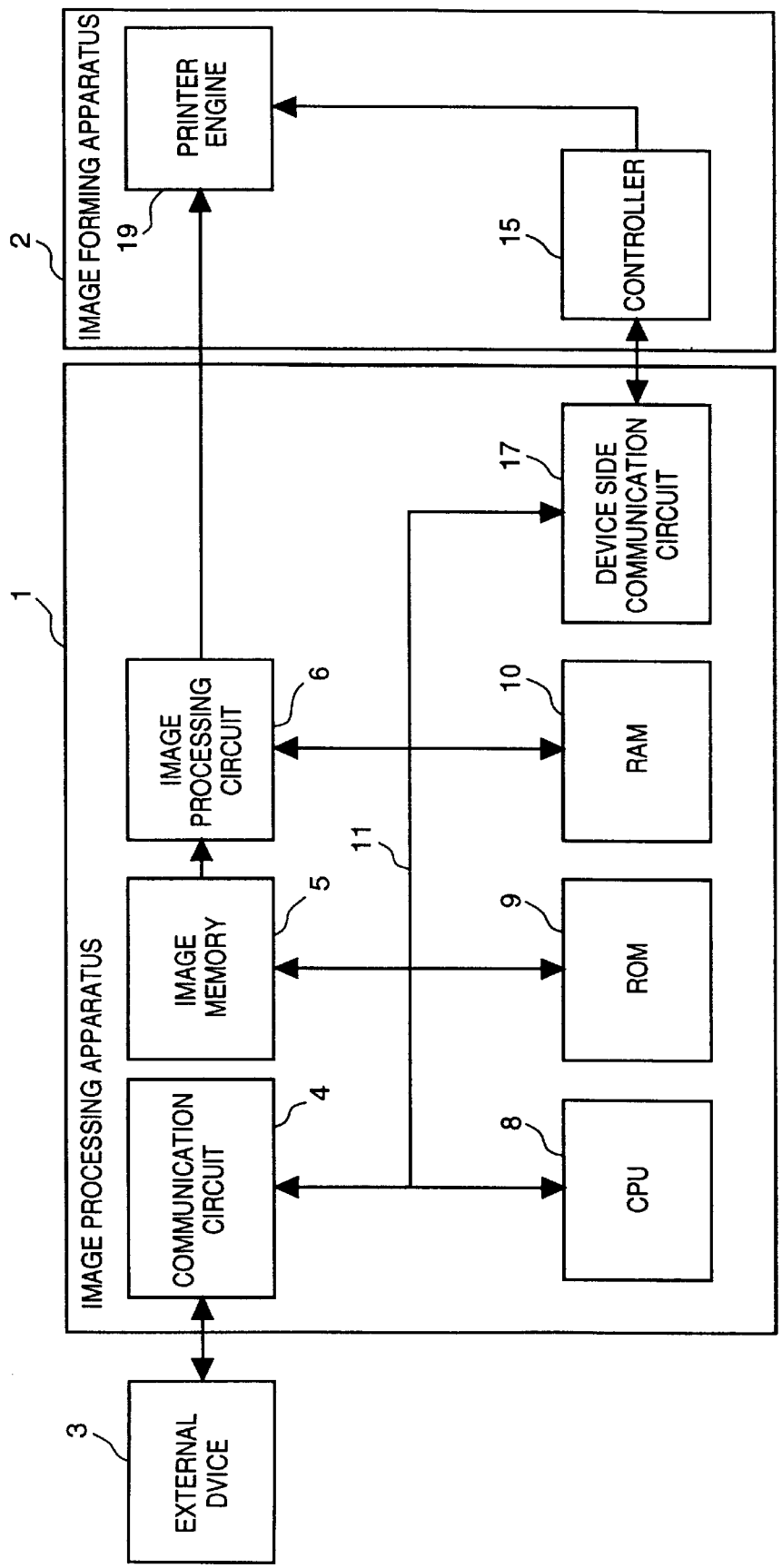
FIG. 1 is a block diagram showing an example of a printer system which forms images.
Figure 2:
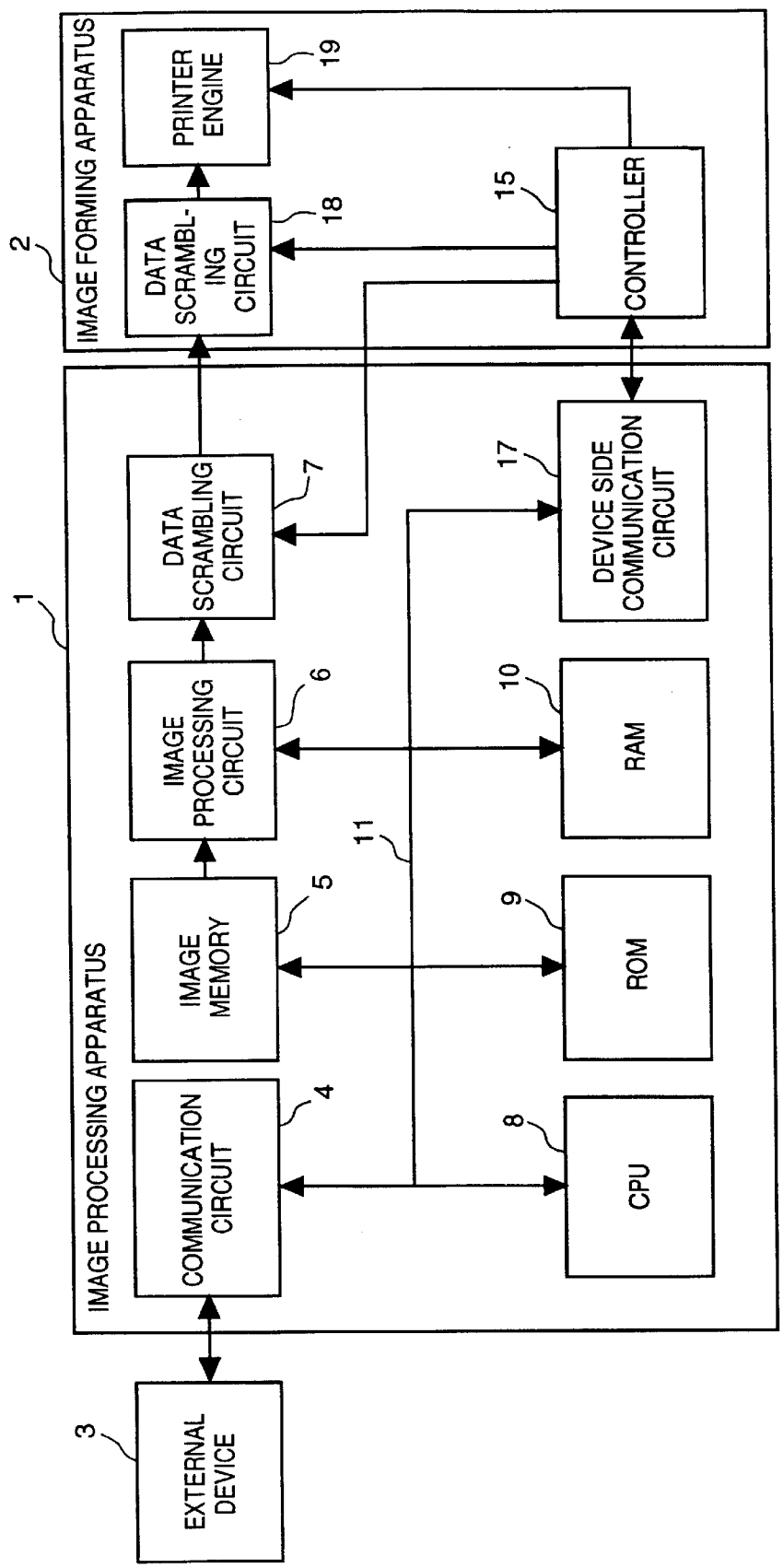
FIG. 2 is a block diagram showing a configuration of an image output system according to a first embodiment of the present invention.

FIG. 2 is a block diagram showing a configuration of the image output system in this embodiment. In FIG. 2, the same units and elements as those in FIG. 1 are referred to by the same reference numerals and explanations of them are omitted.

Reference numeral 7 denotes a data scrambling circuit in the image processing apparatus 1 which applies predetermined scrambling to image data inputted from the image processing circuit 6. Then the scrambled image data is outputted to the image forming apparatus 2. Reference numeral 18 denotes a data scrambling circuits in the image forming apparatus 2, which applies inverse scrambling to the data inputted from the image processing apparatus 1. The image data obtained after applying the inverse scrambling is output to the printer engine 19.

The data scrambling circuit 7 stores a data conversion function f, and the data scrambling circuit 18 stores an inverse data conversion function $f^{-1}$. In both cases, details are described later. These functions can be directly modified by the controller 15 of the image forming apparatus 2. Since the data scrambling circuit 7 is not connected to the CPU bus 11, the CPU 8 of the image processing apparatus 1 does not set the data scrambling circuit 7.

According to the aforesaid configuration, a scrambling function can only be changed by exchanging the ROM (not shown) of the image forming apparatus 2. Further, a manufacturer of the image processing apparatus 1 does not have to be concerned with the content or method of the data scrambling. Furthermore, when the image processing apparatus 1 is connected to the image forming apparatus 2 having a different scrambling function from the one in the image processing apparatus, it is not necessary to set anything relating scrambling in the image processing apparatus 1.

Regarding the configuration shown in FIG. 2, although the data scrambling circuit 7 of the configuration is not connected to the CPU bus 11 and the configuration sets a default scrambling function, for instance, the configuration is within the object of the present invention as far as the data scrambling circuit 7 is directly controlled by the controller 15.

The data scrambling circuits 7 and 18 can be any circuit as long as they can set a reversible conversion function, and a LUT using a RAM is provided as an example. The advantage of a data scrambling circuit using a RAM is that the function can be easily changed. However, since the RAM is for a general-purpose, a data scrambling circuit 7 is easily composed, thus even if an image processing apparatus is not an authorized one, as far as it comprises the same data scrambling circuit 7, it can be connected to the image forming apparatus 2 of this embodiment to make the image forming apparatus 2 print an image. Therefore, in this embodiment, a data scrambling circuit 7 is constructed with a custom IC formed from a programmable gate array.

Figure 3:
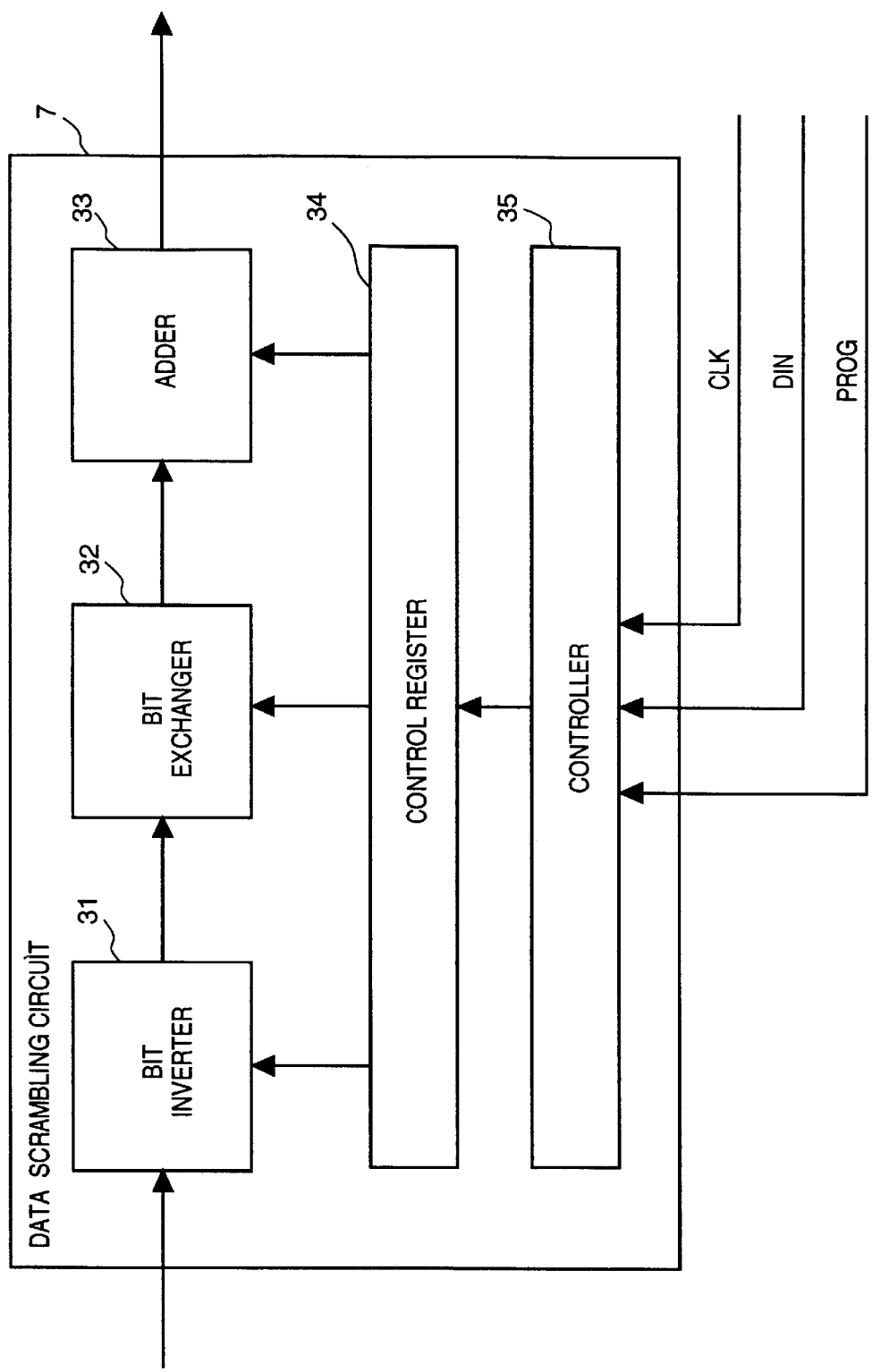
FIG. 3 is the block diagram showing a data scrambling circuit 7 shown in FIG. 2.

FIG. 3 is a block diagram showing the data scrambling circuit 7 consisting of the custom IC.

The image data sent from the image processing circuit 6 is either inverted by bit by bit in a bit inverter 31 or is directly passed through the bit inverter 31 without inversion in accordance with information stored in a control register 34. Next, a number of bits of the image data outputted from the bit inverter 31 are exchanged in a bit exchanger 32 in accordance with information stored in the control register 34. In this process for example, the 0th bit and the 6th bit are exchanged. Then, the image data outputted from the bit exchanger 32 is added with a constant in an adder 33 based on exchanging information stored in the control register 34. For example, if the image data is 8 bit data, by outputting the lower 8 bits of the added result, a reversible operation is implemented.

The exchanging information stored in the control register 34 (also called "program data", hereinafter) is modified in accordance with the timing of a write signal, a write data signal DIN, a write clock CLK, and a write permit signal PROG, all of which are sent from a controller 35. Thus, the controller 35 interprets these signals and writes the write data signal DIN in the control register 34. The control register 34 is preferably a nonvolatile type. However, if the register 34 is a volatile type, it is necessary to write information in the image processing apparatus 1 from the image forming apparatus 2 each time the image processing apparatus 1 is initialized when powered on or reset.

The scrambling performed by the data scrambling circuit 7 can be any type of conversion, such as bit inversion, bit exchange, or addition of a constant, or combinations of the above, as long as the conversion is reversible. The order of the processes of the conversion can be changed. Further, any processes other than bit inversion, bit exchange, or addition of a constant may be used. In order to use a custom IC as the data scrambling circuit 18 of the image forming apparatus 2, it is necessary to reverse the order of processes of the conversion. Thus a configuration of the custom IC in which the order of conversion modules can be changed is preferred.

Figure 4:
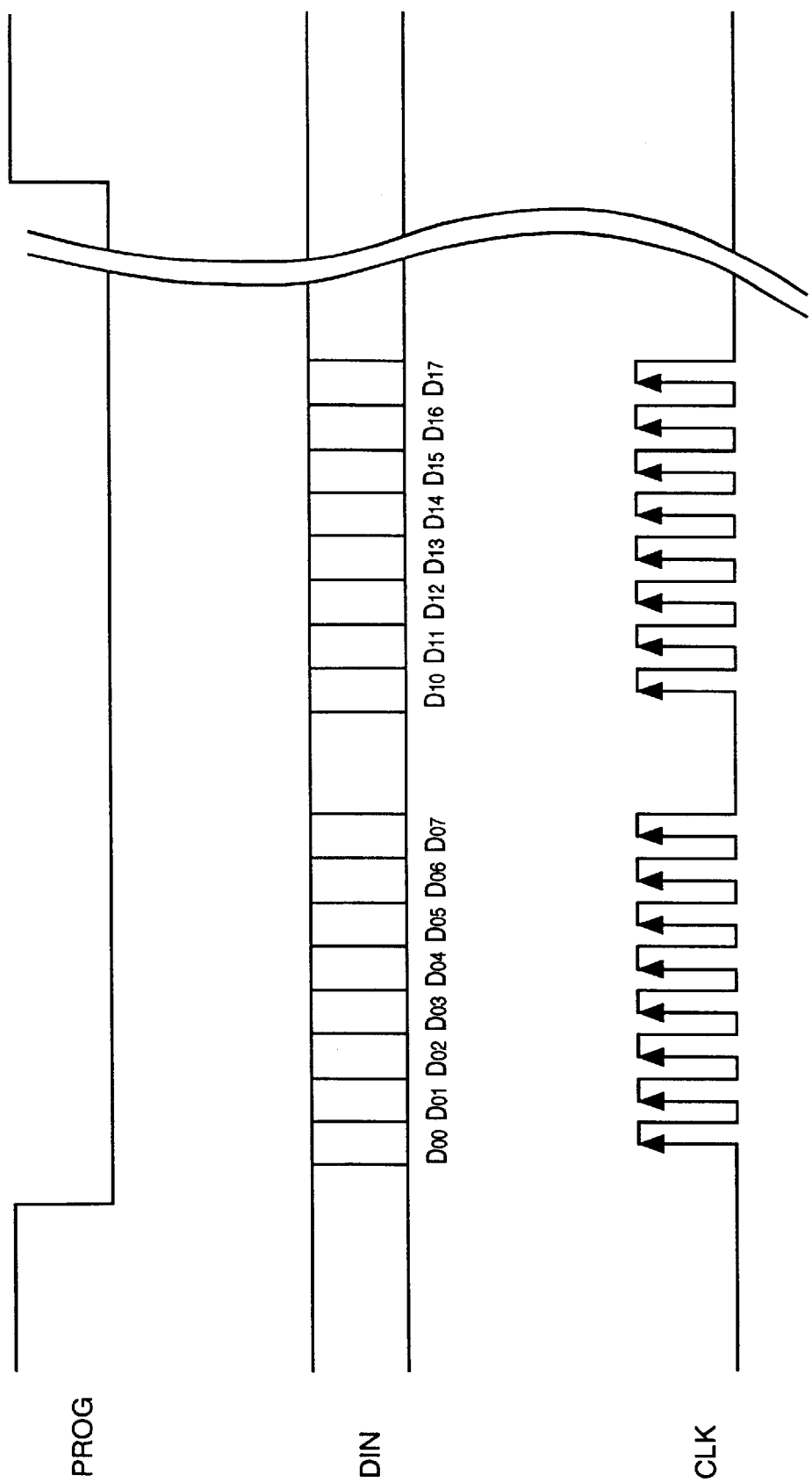
FIG. 4 is a timing chart of signals for writing information in the data scrambling circuit shown in FIG. 3.

FIG. 4 is a timing chart for the write signals for the scrambling circuit.

The controller 15 makes the signal PROG active to inform that a writing process is to start. Then, the write data signal DIN is serially transmitted in synchronization with the clock CLK. Information corresponding to each conversion module is sequentially sent, and the controller 35 writes the received information in the control register 34 sequentially. It is not necessary to designate a write address when the aforesaid writing method is used, however, a protocol which designates addresses is also possible. Further, the write signals are not limited to the above-described signals as far as information from the controller 15 is written to the data scrambling circuit 7.

Regarding the data scrambling circuit 18, although its operation will not be explained in detail, it can be constructed in the same manner as the data scrambling circuit 7. Therefore, program data can be written in the data scrambling circuit 18 from the controller 15, similarly to the data scrambling circuit 7.

As described above, a data scrambling circuit, composed of a custom IC, of an image processing apparatus can be programmed directly from the image forming apparatus. As a result, a scrambling function is arbitrarily changed without exchanging the ROM of the image processing apparatus.

Accordingly, it is difficult for a third party to construct a data scrambling circuit for the image processing apparatus. Further, even if a scrambling function is analyzed by way of reverse engineering or the ROM is copied, it is not possible to manufacture an image processing apparatus capable of connecting to the image forming apparatus of this embodiment.

In addition, it is not necessary for a manufacturer of the image forming apparatus to notify the scrambling function or a used method to authorized manufacturers, thus secrets will not be easily, causing less problems.

Second Embodiment

An image processing apparatus in a second embodiment of the present invention is described below. Note, in the second embodiment, the same units and elements as those in the first embodiment are referred to by the same reference numerals, and explanations of them are omitted.

The second embodiment of the present invention relates to an image input system having an image input apparatus, such as an image scanner, and an image processing apparatus. In this system, the data scrambling circuit of the image processing apparatus is directly programmed by the image input apparatus. The image input apparatus is not limited to an image scanner, and may be a copy machine, a film reader, a video camera, and so on. The system is described below.

Figure 5:
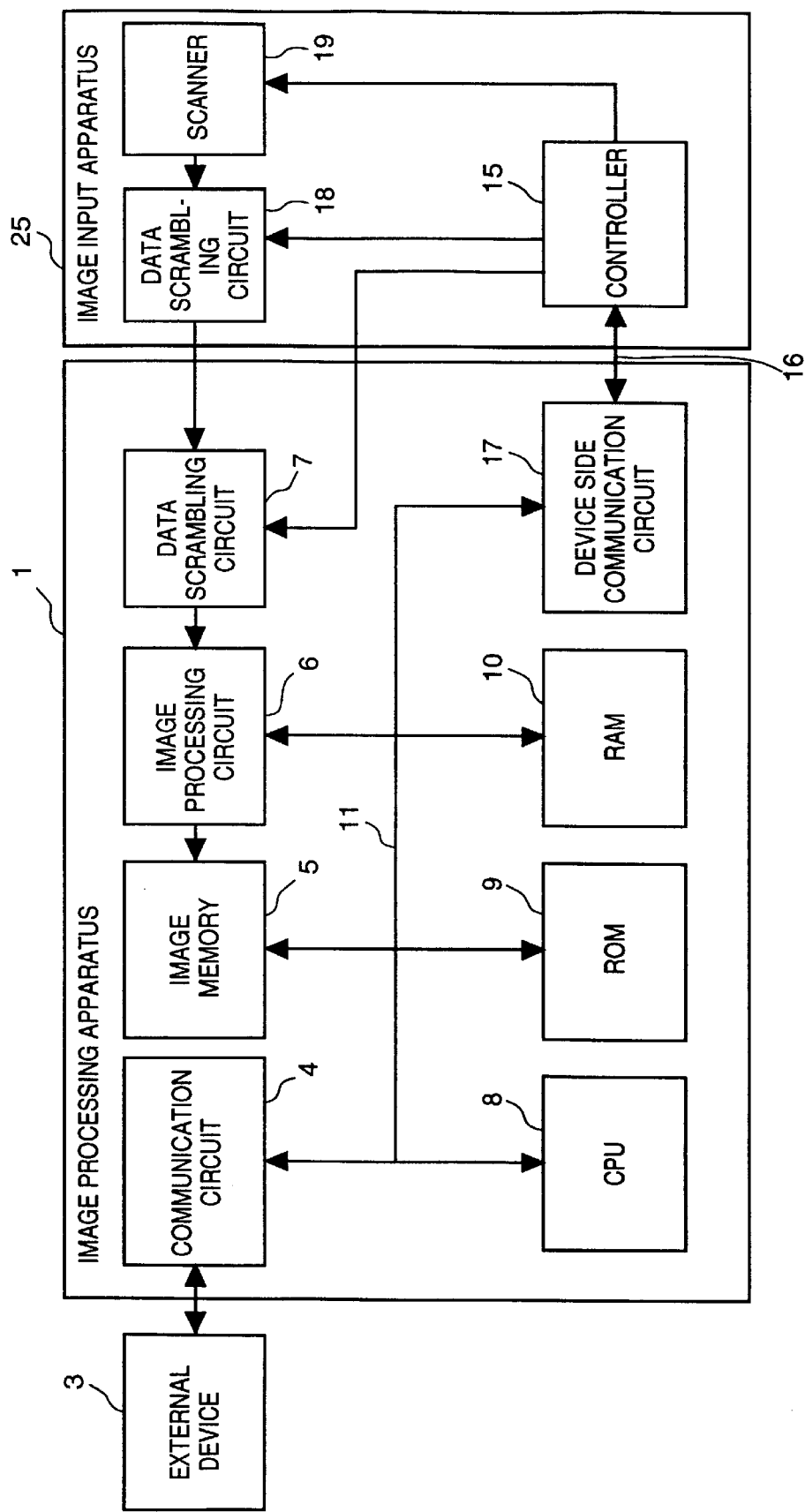
FIG. 5 is a block diagram showing a configuration of an image input system according to a second embodiment of the present invention.

FIG. 5 is a block diagram showing a configuration of the image input system of this embodiment.

Image data outputted from a scanner 22 is scrambled in the data scrambling circuit 18 of an image input apparatus 25, and sent to the image processing apparatus 1. The image processing apparatus 1 applies an inverse scrambling to the data inputted from the data input apparatus 25. The image data is corrected for variations which are characteristics of the image input apparatus 25, such as variation in color which is a characteristic of image reading elements for reading an original and variation in brightness which is a characteristic of a light source, in the image processing circuit 6 by applying a shading correction, input masking process, etc. Thereafter, the corrected image data is written in the image memory 5. Subsequently, the image data stored in the image memory 5 is sent to the external device 3, such as a computer and an image forming apparatus (e.g., a monitor and a printer).

By constructing the image input system as described above, the data scrambling circuit, composed of a custom IC, of the image processing apparatus can be directly programmed from the image input apparatus. Accordingly, the same advantage as in the first embodiment is obtained.

Third Embodiment

An image processing apparatus in a third embodiment of the present invention is described below. Note, in the third embodiment, the same units and elements as those in the first embodiment are referred to by the same reference numerals, and an explanation of them is omitted.

The third embodiment of the present invention relates to an image output system which is similar to the one in the first embodiment. However, the data scrambling circuit of the image processing apparatus in the first embodiment is directly programmed from the image forming apparatus, whereas, in the third embodiment, program data is sent from an image forming apparatus to an image processing apparatus by communication, and the CPU of the image processing apparatus writes the received data into a data scrambling circuit. The system is described below.

Figure 6:
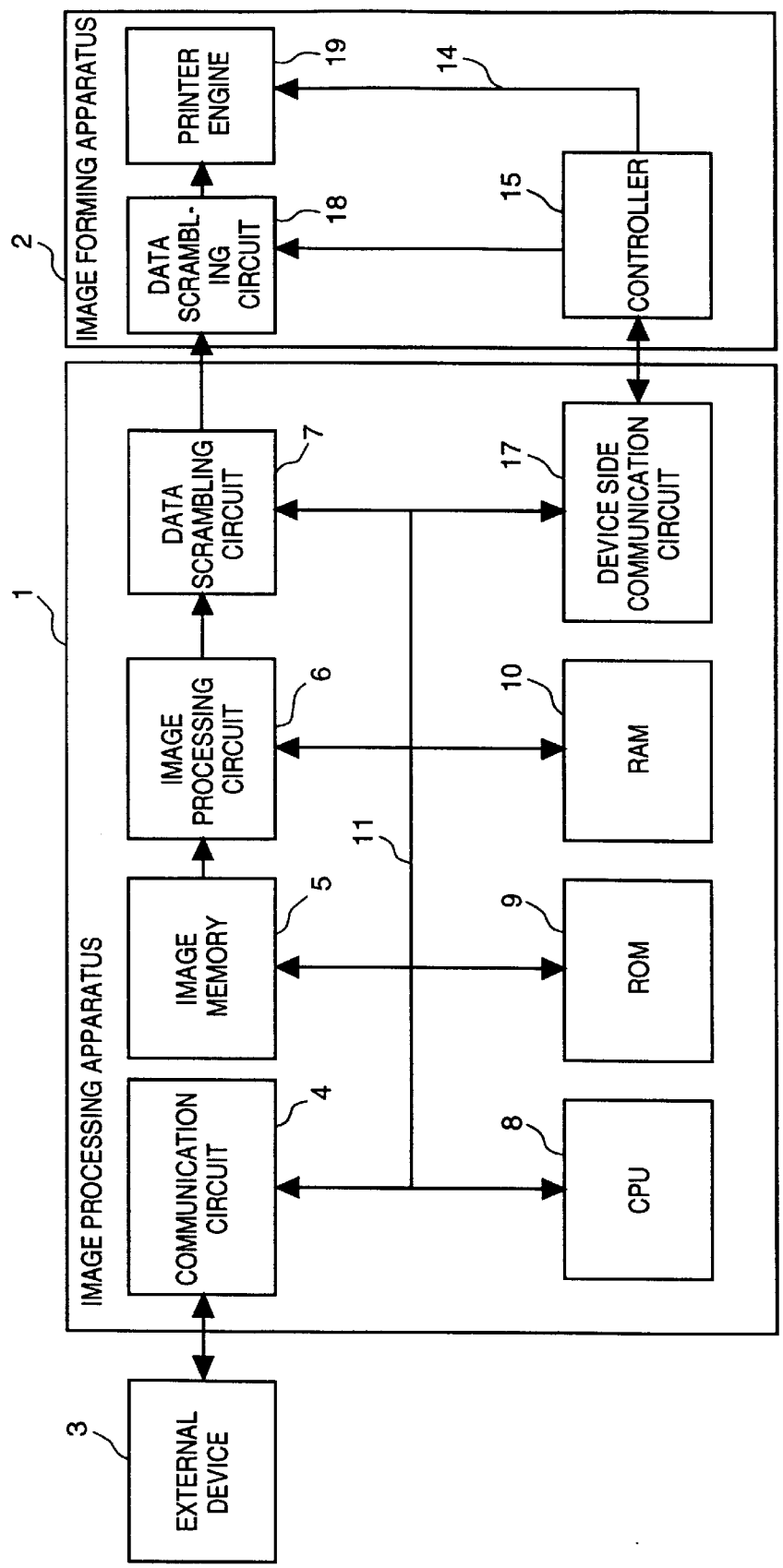
FIG. 6 is a block diagram showing a configuration of an image output system according to a third embodiment of the present invention.

FIG. 6 is a block diagram showing an example of a configuration of the image output system of the third embodiment.

The data scrambling circuit 7 in the image processing apparatus 1 cannot be directly programmed by the controller 15 of the image forming apparatus 2. Instead, the CPU bus 11 is connected to the data scrambling circuit 7 so that the CPU 8 can write in the data scrambling circuit 7.

Therefore, the controller 15 sends program data to be written in the data scrambling circuit 7, as well as a write instruction to the device side communication circuit 17 of the image processing apparatus 1. When the device side communication circuit 17 receives the write instruction, the CPU 8 writes the program data, received with the write instruction, to the data scrambling circuit 7 without processing the program data. Note that the CPU 8 does not have to know the contents of data to be written in the data scrambling circuit 7. Therefore, it only has to have a single program which is executed in accordance with the write instruction and sequentially writes the received data.

With the aforesaid construction, the same advantage as in the first embodiment is obtained. Further, as compared to the first embodiment, a simple program for writing program data in the data scrambling circuit of the image processing apparatus becomes necessary, and a signal line specific for writing program data into the scrambling circuit becomes unnecessary, in the third embodiment. Accordingly, an interface which is currently used can be used in this system.

The construction in this embodiment can be applied to the image input system in the second embodiment. In such a case, the data scrambling circuit 7 of the image processing apparatus 1 can be programmed indirectly from the image input apparatus 25.

Further, the unprocessed program data sent from the image forming apparatus 2 does not always have to be written in the data scrambling circuit 7, and the CPU 8 may process the program data as long as the process does not change the content of the data, then write the data in the data scrambling circuit 7. As examples of the processes which the CPU performs, there is a process to inverse the data, a process to add or delete specific bits, a process to add a constant, a process to change the order of the data, and a process to divide the data. As a whole, any process is allowed as long as the controller 15 can generate program data which releases the data scrambled in accordance with the program data that is changed by the process the CPU 8 applied, or generates program data which scrambles image data that can be released by the changed program data.

Fourth Embodiment

An image processing apparatus in a fourth embodiment of the present invention is described below. Note, in the fourth embodiment, the same units and elements as those in the first embodiment are referred to by the same reference numerals, and an explanation of them is omitted.

The fourth embodiment of the present invention relates to an image output system comprising an image processing apparatus and an image forming apparatus, such as a printer. In this system, an image processing circuit in the image processing apparatus can be directly programmed from the image forming apparatus. Note that the image forming apparatus is not limited to a printer, and can be a display, a copy machine, a film recorder, and so on. The system is described below.

Figure 7:
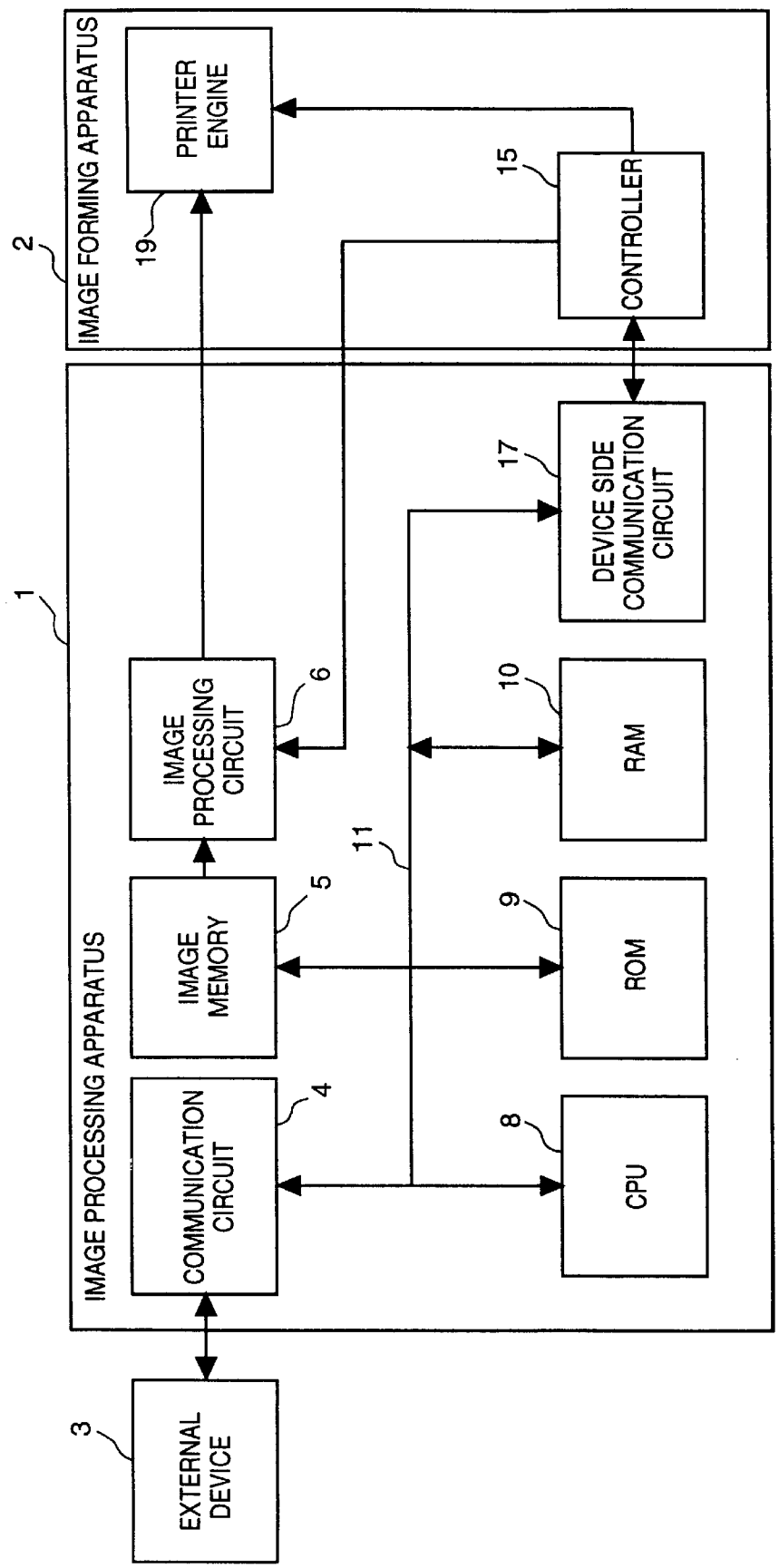
FIG. 7 is a block diagram showing a configuration of an image output system according to a fourth embodiment of the present invention.

FIG. 7 is a block diagram showing a construction of the image output system of the fourth embodiment. Since this embodiment has nothing to do with data scrambling, the data scrambling circuit is omitted in the configuration in FIG. 7. However, the system in FIG. 7 can include the data scrambling circuits as in the former embodiments.

The image processing circuit 6 converts RGB image data read from the image memory 5 into CMYK data and sends it to the image forming apparatus 2. The CMYK data corresponds to colors of toner in the image forming apparatus 2 and relies on characteristics of the image forming apparatus 2. Accordingly, a conversion function or a conversion table for converting from the RGB data to the CMYK data differs depending upon the image forming apparatus to be used. Conventionally, the conversion function or table is stored in the ROM 9, for instance, thus the conversion function or table is changed by exchanging the ROM. In the fourth embodiment, the conversion function or table is programmed from the controller 15 of the image forming apparatus 2.

Thereby the conversion function or table is adjusted in accordance with conditions of the image forming apparatus 2, such as a kind of toner to be used, environmental temperature, environmental humidity, and a kind of recording paper sheet to be used (e.g., film for OHP, normal recording paper, thick paper). Further, without specifically setting the image processing apparatus 1, a new image forming apparatus 2 can be connected.

Figure 8:
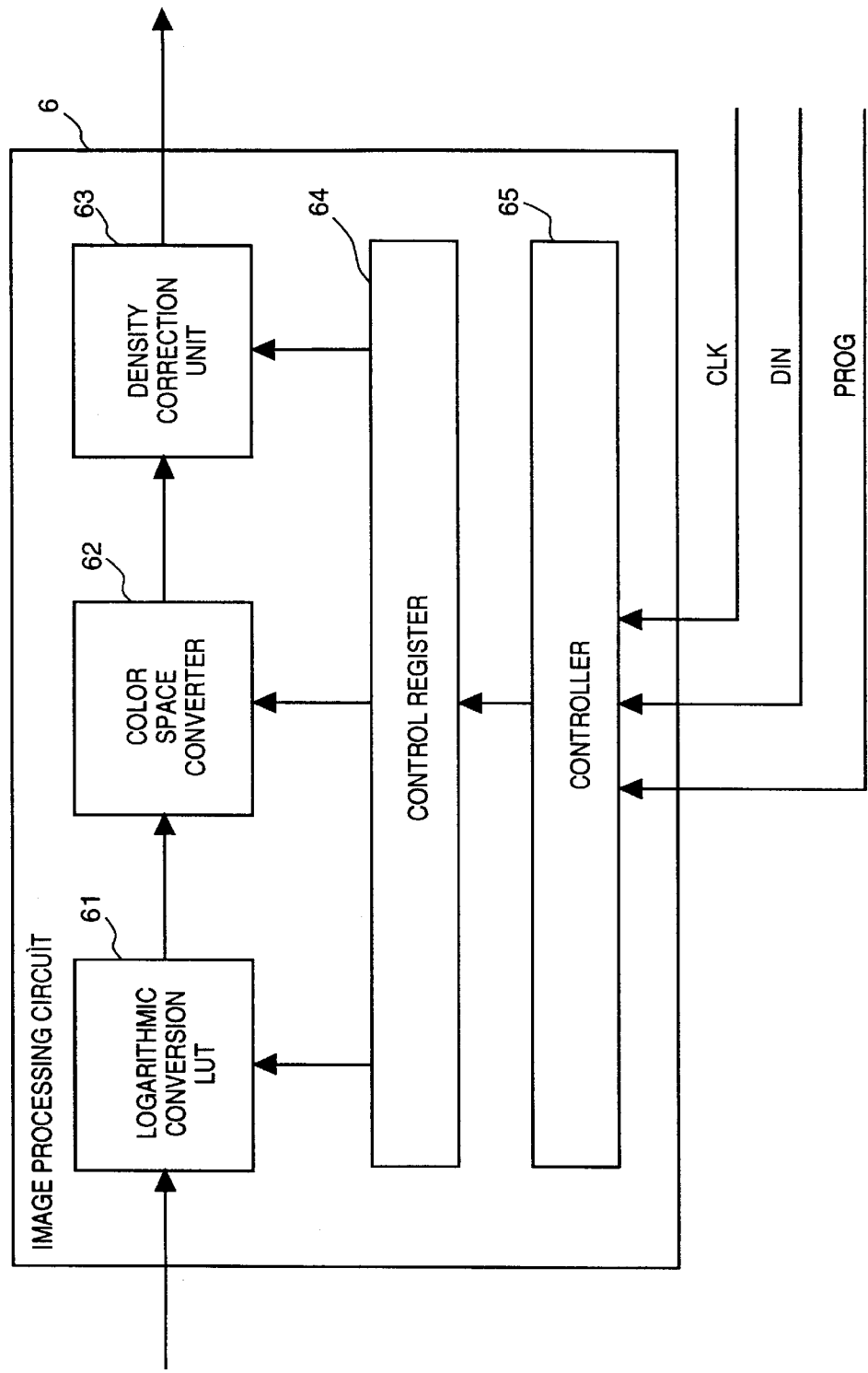
FIG. 8 is a block diagram showing a configuration of the image processing circuit 6 shown in FIG. 7.

The image processing circuit 6 of the fourth embodiment consists of a custom IC which is constructed by a gate array, as in the data scrambling circuit 7 in the former embodiments. FIG. 8 is a block diagram showing that the configuration of the image (procession) circuit 6 consists of a custom IC.

The RGB image data (luminance information) read from the image memory 5 is converted to CMY image data (density information) in a logarithmic conversion LUT 61 on the basis of processing information stored in a control register 64. The CMY image data outputted from the logarithmic conversion LUT 61 is then converted to CMYK image data in a color space converter 62.

This RGB-CMYK conversion is a color space conversion process which converts a color space (RGB) of the image data inputted into the image processing apparatus 1 into a color space (CMYK) of the image forming apparatus 2. There are variety of conversion methods which can be performed by the color space converter 62, however, it is basically prescribed by a matrix operation which operates three variables and outputs four values. This matrix operation can be performed by a multiplier, an adder, and a subtractor and is well known as a masking process, thus the explanation of the process is omitted. Note that coefficients used in the matrix operation are stored in the control register 64.

Further, there are RGB image data whose color spaces differ from each other. For example, an RGB color space of an image scanner generally differs from an RGB color space suitable for display on a monitor. The conversion between these two RGB color spaces is also a color space conversion. For example, in a case where the image forming apparatus 2 deals with image data in an RGB color space, the color space converter 62 performs an RGB-RGB color space conversion.

The density of the CMYK image data outputted from the color space converter 62 is corrected in a density correction unit 63 which is composed of a LUT for each color. The density correction is a process to apply corrections corresponding to density characteristics of the image forming apparatus 2 ($\gamma$ correction). Thus, the correction must correspond to the aforesaid condition of the image forming apparatus 2, and correction coefficients may frequently change compared to coefficients used in the color space conversion. The contents of the LUTs are stored in the control register 64.

Regarding a method for writing program data (parameters for the aforesaid conversion and correction) in the control register 64 of the image processing circuit 6, a method of directly writing from the controller 15 to the data scrambling circuit 7, as explained in the first embodiment and a method of indirectly writing via the CPU 8 can be used.

Further, the image processing circuit 6 of the fourth embodiment comprises three programmable conversion modules. However, in general, it is not necessary to prepare all these conversion modules, or to program all the conversion modules from the image forming apparatus 2. Furthermore, conversion modules differing from the above three may be used.

As described above, the image processing circuit, constructed from a custom IC, of the image processing apparatus can be programmed from the image forming apparatus, thus image processing functions and tables can be arbitrarily changed.

Therefore, without changing the ROM of the image processing apparatus, it is possible to make the image processing apparatus perform image processing suitable for a new image forming apparatus, furthermore, image processing in correspondence with a condition of the image forming apparatus, such as a kind of toner to be used, environmental temperature, environmental humidity, and a kind of recording paper sheet to be used (e.g., film for OHP, normal recording paper, thick paper).

In this embodiment, an image forming system is described, however needless to say, in the image input system described in the second embodiment, an image processing circuit of the image processing apparatus can be programmed from the image input apparatus. In such a case, when a newly developed image input apparatus is to be connected, image processing parameters of the image processing apparatus can be easily changed, thereby image processing which is suitable for the new image input apparatus can be performed by the image processing apparatus.

Similarly, image processing parameters corresponding to image reading conditions of a film reader and an image scanner and image sensing conditions of a video camera can be set in the image processing apparatus.

Modifications

In a case where the image input apparatus outputs color image data (e.g., RGB data, YMC data, L*a*b* data) to the image processing apparatus, by setting a data scrambling circuit so as to apply data scrambling to an arbitrary color component instead of setting data scrambling circuits for each color component separately and applying data scrambling to all the color components, it is possible to greatly simplify a configuration of a data scrambling circuit capable of preventing an undesirable image input apparatus from being connected.

Further, in a configuration which sequentially applies scrambling to all the color component data by using a single data scrambling circuit, instead of using data scrambling circuits for each color component, by applying scrambling to only an arbitrary color component, it is possible to reduce the amount of color image data to be processed by the scrambling process. Thereby, it is possible to speed up transmission of color image data from the image input apparatus to the image processing apparatus.

Further, by setting the aforesaid arbitrary color component to be changeable, and by notifying the changed color component from the controller 15 of the image input apparatus to the controller 35 of the data scrambling circuit in order to update settings of the data scrambling circuit, the color components to be applied with the scrambling process can be changed. Thereby reliability of security increases.

The aforesaid configuration can be applied not only to the combination of the image processing apparatus and the image input apparatus, but also to a combination of an image processing apparatus and image forming apparatus, and further to a combination of an image processing apparatus and a computer.

In the above embodiments, the image forming systems for forming images based on received RGB image data are described. However, an image forming system may form images based on, for example, CMYK image data and PDL data written in PDL (Page Description Language).

Further, in the above embodiments, the external devices and the image processing apparatus are constructed separately, however, there is a case where an image processing apparatus is built in an external device as a function extension board. Furthermore, if the external device, the image input apparatus, and image processing apparatus are partially or totally constructed as a single device, the present invention can be applied to such device as far as image signals can be fetched from each functional unit through an interface or the like.

Further, in the above embodiments, image data and conversion information (or processing information) are received from an external device by communication. However, they can be received via a memory medium, such as a floppy disk, a hard disk, a CD-ROM, a magneto-optical disk, a laser disk, an optical disk, and the like.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
generating means for generating color image data composed of a plurality of color components; and
conversion means for performing a scrambling process on a specific color component of the color image data generated by said generating means on the basis of scrambling information and for outputting the scrambled specific color component of the color image data and other color components of the color image data to an external apparatus,
wherein said conversion means has a first controller for performing the scrambling process in accordance with scrambling information inputted from said external apparatus, and the first controller is independent of a second controller for controlling said image processing apparatus.

2. The image processing apparatus according to claim 1, wherein said conversion means comprises a register for storing the scrambling information and an operation unit for applying the scrambling process to the input image data on the basis of the scrambling information stored in the register,
wherein the register and the operation unit are formed on a one-chip semiconductor.

3. The image processing apparatus according to claim 1 wherein said external apparatus is an image forming apparatus having inverse conversion means which performs inverse conversion to the scrambling process performed by said conversion means.

4. The image processing apparatus according to claim 1, wherein said conversion means comprises a gate array which scrambles the image data generated by said generating means and outputs the scrambled data to said external apparatus.

5. The image processing apparatus according to claim 1, wherein a scrambling function of the scrambling process performed by said conversion means can be changed to a different scrambling function.

6. The image processing apparatus according to claim 1, wherein said conversion means comprises a register for storing the scrambling information and an operation unit for applying the scrambling process to the input image data on the basis of the scrambling information stored in the register, and
wherein the register and the operation unit are formed on a one-chip semiconductor.

7. An image processing apparats comprising:
conversion means for performing a descrambling process on a specific color component data of color image data inputted from an external apparatus and obtaining color image data which is descrambled by the descrambling process; and
processing means for applying predetermined image processes to the color image data obtained by said conversion means,
wherein said conversion means has a first controller for performing the descrambling process in accordance with scrambling information inputted from said external apparatus, and the first controller is independent of a second controller for controlling said image processing apparatus.

8. The image processing apparatus according to claim 7, wherein said external apparatus has means for scrambling the specific color component of the color image data to be outputted on the basis of the scrambling formation.

9. The image processing apparatus according to claim 7, wherein said conversion means comprises a gate array which descrambles the specific color component data of the color image data inputted from said external apparatus and outputs the descrambled data to said processing means.

10. The image processing apparatus according to claim 7, wherein a descrambling function of the descrambling process performed by said conversion means can be changed to a different descrambling function.

11. The image processing apparatus according to claim 7, wherein said conversion means comprises a register for storing the scrambling information and an operation unit for applying the descrambling process to the specific color component data of the input color image data on the basis of the scrambling information stored in the register, and
wherein the register and the operation unit are formed on a one-chip semiconductor.

12. An image processing method performed using an image processing apparatus, comprising:
a generating step of generating color image data composed of a plurality of color components; and
a conversion step of performing by a conversion means a scrambling process on a specific color component of the color image data generated by said generating step on a basis of scrambling information and of outputting the scrambled specific color component of the color image data and other color components of the color image data to an external apparatus,
wherein said conversion means has a first controller for performing the scrambling process in accordance with scrambling information inputted from said external apparatus, and the first controller is independent of a second controller for controlling said image processing apparatus.

13. The image processing method according to claim 12, wherein said conversion means comprises a register for storing the scrambling information and an operation unit for applying the scrambling process to the input image data on the basis of the scrambling information stored in the register,
wherein the register and the operation unit are formed on a one-chip semiconductor.

14. The image processing method according to claim 12, wherein said external apparatus is an image forming apparatus having inverse conversion means which performs an inverse conversion step to the scrambling process performed by said conversion step.

15. The image processing method according to claim 12, wherein said conversion means comprises a gate array which scrambles the image data generated by said generating step and outputs the scrambled data to said external apparatus.

16. The image processing method according to claim 12, wherein a scrambling function of the scrambling process performed by said conversion step can be changed to a different scrambling function.

17. The image processing method according to claim 12, wherein said conversion means comprises a register for storing the scrambling information and an operation unit for applying the scrambling process to the input image data on the basis of the scrambling information stored in the register, and
wherein the register and the operation unit are formed on a one-chip semiconductor.

18. An image processing method performed by an image processing apparatus, comprising:
a conversion step, performed by a conversion means, of performing a descrambling process on a specific color component data of color image data inputted from an external apparatus and obtaining color image data which is descrambled by the descrambling process; and a processing step, performed by a processing means, of applying predetermined image process to the color image data obtained by said conversion step, wherein said conversion means has a first controller for performing the descrambling process in accordance with scrambling information inputted from said external apparatus, and the first controller is independent of a second controller for controlling said image processing apparatus.

19. The image processing method according to claim 18, wherein said conversion means comprises a gate array which descrambles the specific color component data of the color image data inputted from said external apparatus and outputs the descrambled data to said processing means.

20. The image processing apparatus according to claim 18, wherein said conversion means comprises a register for storing the scrambling information and an operation unit for applying the descrambling process to the specific color component data of the input color image data on the basis of the scrambling information stored in the register, and wherein the register and the operation unit are formed on a one-chip semiconductor.

21. The image processing method according to claim 20, wherein a descrambling function of the descrambling process performed by said conversion means can be changed to a different descrambling function.

22. The image processing method according to claim 18, wherein said external apparatus performs a step of scrambling the specific color component of the color image data to be outputted on the basis of the scrambling information.

23. An image processing apparatus comprising:

generating means for generating image data composed of a plurality of components; and means for performing a scrambling process on a predetermined component of the image data generated by said generating means on a basis of scrambling information and for outputting the scrambled predetermined component of the image data and other components of the image data to an external apparatus, wherein said means for performing has a first controller for performing the scrambling process in accordance with scrambling information inputted from the external apparatus, and the first controller is independent of a second controller for controlling said image processing apparatus.

24. An image processing method performed by an image processing apparatus comprising:

a generating step, performed by a generating means, of generating image data composed of a plurality of components; and a step of performing, by a performing means, a scrambling process on a predetermined component of the image data generated by said generating step on a basis of scrambling information and of outputting the scrambled predetermined component of the image data and other components of the image data to an external apparatus, wherein said performing means has a first controller for performing the step of performing the scrambling process in accordance with scrambling information inputted from the external apparatus, and the first controller is independent of a second controller for controlling said image processing apparatus.

* * * * *

UNITED STATES PATENT AND TRADEMARK OFFICE
CERTIFICATE OF CORRECTION

PATENT NO. : 6,282,310 B1
DATED : August 28, 2001
INVENTOR(S) : Toshihiro Kadowaki It is certified that error appears in the above-identified patent and that said Letters Patent is hereby corrected as shown below:

Title page,
Item [56], References Cited,

| Insert: | | | | |
|---|---|---|---|---|
| -- 4,491,983 | * | 1/1985 | Pinnow et al. | 380/10 |
| 4,532,508 | * | 7/1985 | Ruell | 340/825.34 |
| 4,831,438 | * | 5/1989 | Bellman, Jr. et al. | 348/148 |
| 5,027,400 | * | 6/1991 | Baji et al. | 380/20 |
| 5,237,610 | * | 8/1993 | Gammie et al. | 380/10 |
| 5,335,277 | * | 8/1994 | Harvey et al. | 380/20 -- |

Drawings,
Sheet 1 of 8,
FIG. 1, "DVICE" should read -- DEVICE --.

Column 2,
Line 58, "to" should read -- for --.

Column 3,
Line 12, "discloses" should read -- is directed to --.

Column 4,
Line 4, "a" should read -- the --;
Line 48, "a" should be deleted; and
Line 49, "applies" should read -- apply --.

Column 5,
Line 27, "by" (first occurrence) should be deleted; and
Line 33, "process" should read -- process, --.

Column 6,
Line 31, "easily, causing" should read -- easily discovered, resulting in --.

UNITED STATES PATENT AND TRADEMARK OFFICE
CERTIFICATE OF CORRECTION

PATENT NO. : 6,282,310 B1
DATED : August 28, 2001
INVENTOR(S) : Toshihiro Kadowaki It is certified that error appears in the above-identified patent and that said Letters Patent is hereby corrected as shown below:

Column 11,
Line 45, "and" should be deleted; and
Line 48, "apparats" should read -- apparatus --.

Column 12,
Line 14, "and" should be deleted; and
Line 60, "and" should be deleted.

Column 13,
Line 24, "and" should be deleted.

Signed and Sealed this

Thirtieth Day of April, 2002

*Attest:*

JAMES E. ROGAN
*Director of the United States Patent and Trademark Office*

*Attesting Officer*